(12) United States Patent
Kajiya et al.

(10) Patent No.: US 7,291,423 B2
(45) Date of Patent: Nov. 6, 2007

(54) PRISMATIC SEALED BATTERY

(75) Inventors: Hiromi Kajiya, Toyohashi (JP); Shoji Karasawa, Kosai (JP); Masato Onishi, Toyohashi (JP); Takashi Asahina, Toyohashi (JP); Shinji Hamada, Toyohashi (JP); Toyohiko Eto, Toyota (JP)

(73) Assignees: Matsushita Electric Industrial Co., Ltd., Aichi (JP); Toyota Jidosha Kabushiki Kaisha, Aichi (JP)

( * ) Notice: Subject to any disclaimer, the term of this patent is extended or adjusted under 35 U.S.C. 154(b) by 362 days.

(21) Appl. No.: 10/486,126

(22) PCT Filed: Aug. 5, 2002

(86) PCT No.: PCT/JP02/07986

§ 371 (c)(1),
(2), (4) Date: Feb. 6, 2004

(87) PCT Pub. No.: WO03/015194

PCT Pub. Date: Feb. 20, 2003

(65) Prior Publication Data

US 2004/0170891 A1   Sep. 2, 2004

(30) Foreign Application Priority Data

Aug. 6, 2001 (JP) ............................. 2001-237755
Jan. 18, 2002 (JP) ............................. 2002-009512
Jan. 23, 2002 (JP) ............................. 2002-014703

(51) Int. Cl.
*H01M 2/24* (2006.01)
*H01M 2/26* (2006.01)
*H01M 6/46* (2006.01)
*H01M 2/04* (2006.01)
*H01M 2/08* (2006.01)

(52) U.S. Cl. ...................... 429/160; 429/161; 429/153; 429/176; 429/185

(58) Field of Classification Search .................... None
See application file for complete search history.

(56) References Cited

U.S. PATENT DOCUMENTS 5,709,966 A   1/1998   Sawada et al.

(Continued)

FOREIGN PATENT DOCUMENTS

EP   1071153   1/2001

(Continued)

*Primary Examiner*—Dah-Wei Yuan
*Assistant Examiner*—Karie O'Neill
(74) *Attorney, Agent, or Firm*—Jordan and Hamburg LLP

(57) ABSTRACT

A prismatic sealed battery has a prismatic battery case (3) which includes a plurality of prismatic containers (4) coupled in a row via partitions (5), electrode plate assemblies (8), and collectors (10) which are joined to lead portions on both sides of the electrode plate assemblies (8). Each container (4) contains the electrode plate assembly (8) to which said collectors 10 are joined. An opening (21) is formed in at least one side wall (20) of the prismatic battery case (3) and in a position where each partition (5) is disposed, in such a manner as to face the containers (4) on both sides, and a conductive connection member (23) disposed in the opening (21) is connected to the collectors (10, 10) on both sides of the partition (5). Since the current-carrying path between the electrode plate assemblies (8) becomes short, internal resistance decreases, and hence internal resistance per cell (2) is reduced. Even and full use of the whole electrode plate assembly (8) achieves higher power output.

18 Claims, 14 Drawing Sheets

U.S. PATENT DOCUMENTS

| | | |
|---|---|---|
| 6,304,057 B1 | 10/2001 | Hamada et al. |
| 6,833,010 B2 * | 12/2004 | Asahina et al. ............ 29/623.1 |
| 6,838,209 B2 | 1/2005 | Langan et al. |
| 6,939,642 B2 | 9/2005 | Asahina et al. |
| 6,982,131 B1 * | 1/2006 | Hamada et al. ............ 429/148 |
| 2001/0007728 A1 | 7/2001 | Ogata et al. |
| 2003/0027040 A1 | 2/2003 | Asahina et al. |

FOREIGN PATENT DOCUMENTS

| | | |
|---|---|---|
| EP | 1091427 | 4/2001 |
| JP | 8-162090 | 6/1996 |
| JP | 2001-093503 | 4/2001 |
| JP | 2001-126690 | 5/2001 |
| JP | 2001-126706 | 5/2001 |
| JP | 2001-176454 | 6/2001 |
| JP | 2002-231300 | 8/2002 |

\* cited by examiner

PRISMATIC SEALED BATTERY

TECHNICAL FIELD

The present invention relates to a prismatic sealed battery, and more particularly to a prismatic sealed battery such as a battery module, including a plurality of connected cells, in which internal resistance is reduced.

BACKGROUND ART

A conventional battery module, including a plurality of connected individual cells to obtain predetermined capacity, includes a plurality of prismatic cells which are so disposed that the wide-width sides of containers thereof are opposed to each other, end plates attached to the outside of the containers of both end cells, a restraining band for integrally binding the cells and the end plates. In each cell, leads upwardly drawn out of the upper end portions of electrode plates are connected to terminals attached to a lid of the container, and connection plates connect the terminals of every cell to constitute the battery module.

In the conventional battery module, the resistance of component parts including connection parts is high due to long connection paths among cells and many connection points. Since the ratio between the resistance of parts and the resistance of cell reaction by positive and negative electrodes and an electrolytic solution reaches 40 to 50%:60 to 50%, high internal resistance increases the heat generation of the battery. Increase in heat generation becomes barriers to the actualization of high power output and improvement in a lifetime. Also there is a problem that the complex connection structure among the cells and the many component parts increase cost.

Thus, the present applicants, as shown in FIGS. 22 and 23, formerly suggested a prismatic sealed battery 1 containing a plurality of cells 2. A prismatic battery case 3 taking the shape of a flat prism comprises containers 4 of the prismatic cells 2, each of which has narrow-width sides and wide-width sides. In the prismatic battery case 3, the containers 4 are integrally coupled in a row in such a manner as to share their narrow-width sides as partitions 5, and the upper openings of every container 4 are integrally closed by an integral lid 6. A connection hole 7 is formed in the outer narrow-width sides of both end containers 4, and in the upper portion of the partitions 5 between the containers 4, 4. An electrode plate assembly 8 as an electric power generation element, which comprises rectangular positive and negative electrode plates laminated with separators interposed therebetween, is contained in each container 4 with an electrolytic solution to compose the cell 2. One side of the positive electrode plates and the other side of the negative electrode plates of the electrode plate assembly 8 protrude oppositely to each other to form lead portions 9a and 9b of the positive and negative electrode plates, and collector plates 10a and 10b are connected to the side end of the lead portions 9a and 9b, respectively, by welding or the like.

A connection projection 11, which is fitted into the connection hole 7, is provided in the upper end portion of the collector plates 10a and 10b, and the connection projections 11 of the positive and negative collector plates 10a and 10b are connected to each other by welding between the adjoining containers 4, 4. In the outer narrow-width sides of both end containers 4, a positive or negative connection terminal 12 is attached to the connection hole 7, and a connection projection 13 thereof is connected to the connection projection 11 of the collector plate 10a or 10b by welding.

Therefore, the plurality of cells 2 contained in the prismatic battery case 3 are connected in series, and electric power is outputted between both connection terminals 12, 12.

The lid 6 is provided with communicating paths 14 for even the internal pressure of each container 4, safety vents (not illustrated) for releasing the internal pressure when it exceeds a predetermined value, a sensor attachment hole 15 for attaching a temperature sensor which detects the temperature of the predetermined cell 2 and the like.

According to the structure described above, since the connection path between the positive or negative electrode plate of the electrode plate assembly 8 and the lead portion 9a or 9b becomes short, and the lead portions 9a and 9b are connected inside the prismatic battery case 3 via the collector plates 10a and 10b, it is possible to decrease the resistance of component parts including connection parts due to the short connection path and the small number of connection points, as compared with the above-mentioned conventional battery module in which individual cells are connected, and hence internal resistance decreases.

In the structure illustrated in FIGS. 22 and 23, although the connection path from the positive or negative electrode plate to the lead portion 9a or 9b and the collector plate 10a or 10b is short, since the collector plates 10a and 10b are connected by welding at one point between the ends of the connection projections 11 provided upper end portion thereof, the connection path detours and becomes long as shown by arrows S in FIG. 24, and the single connection point increases internal resistance.

In accordance with the detour of the connection path, as shown by arrows T, a large amount of electric current passes through the electrode plate assembly 8 in a portion near the connection point between the collector plates 10a and 10b, but the amount of current decreases with distance from the connection point. Thus, since current distribution passing through the electrode plate assembly 8 becomes uneven, the whole electrode plate assembly 8 does not evenly exercise its electric power generation capability, so that there is a problem that a large loss occurs.

An object of the present invention is to provide a prismatic sealed battery that have higher power output by further decreasing internal resistance per cell, and making the whole electrode plate assembly, as an electric power generation element, evenly and fully exercise its capability.

SUMMARY OF THE INVENTION

According to a first aspect of the invention, a prismatic sealed battery has a prismatic battery case which includes a plurality of prismatic containers coupled in a row via partitions. Each container contains an electric power generation element. An opening is formed in at least one side wall of the prismatic battery case and in at least one position where a partition is disposed, in such a manner as to lead into the containers on both sides. A conductive connection member connects the electric power generation elements disposed on both sides of the partition through the opening.

According to this structure, since the conductive connection member connects the electric power generation elements contained in the adjoining containers in the side wall of the prismatic battery case, the electric power generation elements are connected to each other at desired positions. If the connection path between the electric power generation elements is disposed at the midpoint of the partition in a perpendicular direction, as compared with a case where only the upper end portions of the electric power generation elements are connected, a current-carrying path does not detour, and the connection path becomes short, so that the connection resistance between cells becomes low. Thus, internal resistance per cell is further decreased, and higher power output is achieved. Since there is a plurality of connection paths between electric power generation elements, the current-carrying path further becomes shorter, and internal resistance per cell is reduced still further. Thus, the distribution of current passing through the electric power generation elements becomes even, so that even and full use of the whole electric power generation element achieves still higher power output. Also, the prismatic battery case is made compact, because the connection member is not accommodated in the containers.

According to a second aspect of the invention, a prismatic sealed battery has a prismatic battery case including a plurality of prismatic containers coupled in a row via partitions, an electrode plate assembly having positive and negative electrode plates laminated with separators interposed therebetween, and collectors. One side of the positive electrode plate and the other side of the negative electrode plate protrude oppositely to each other to form lead portions, and the collector is joined to the lead portion. Each container contains the electrode plate assembly with the collectors joined thereto. An opening is formed in at least one side wall of the prismatic battery case and in at least one position where a partition is disposed, in such a manner as to lead into the containers on both sides. A conductive connection member connects the collectors disposed on both sides of the partition through the opening.

According to this structure, the current-carrying path between the electrode plate assembly and the collector is straight and short in each container, and the conductive connection member connects the collectors, opposed to each other across the partition between the containers, through the openings formed in one side wall of the prismatic battery case. Thus, as in the case described above, the collectors are connected to each other at desired positions. If the connection path between the collectors is disposed at the midpoint of the partition in a perpendicular direction, as compared with a case where only the upper end portions of the collectors are connected, the current-carrying path does not detour, and the connection path becomes short, so that the connection resistance between cells becomes low. Since there is a plurality of connection paths between collectors, the current-carrying path further becomes shorter, and internal resistance per cell is reduced still further. Thus, the distribution of current passing through the electrode plate assembly becomes even, so that even and full use of the whole electrode plate assembly achieves higher power output.

It is preferable that an opening is provided in at least one side wall of the prismatic battery case and in a position where each partition is disposed in such a manner as to face the containers on both sides, and the conductive connection member disposed in the opening is connected to the collectors positioned on both sides of the partition, and the conductive connection member is hermetically sealed in the prismatic battery case via an elastic body layer. Since the elastic body layer is disposed between the partition or the side wall of the prismatic battery case and the conductive connection member, an exfoliation gap is prevented from occurring between them due to difference in the thermal expansion coefficients of the battery case and the conductive connection member. Accordingly, an electrolytic solution is prevented from leaking and electrolytic solution transfer is also prevented.

Furthermore, if the elastic body layer is made of fluorinated rubber, the elastic body layer has high resistance to the electrolytic solution and holds necessary resistance to heat even if the temperature of the battery increases. Thus, the battery acts for a long time with stability, and high reliability for long time use is obtained.

It is preferable that the elastic body layer is disposed on the outer periphery of a part of the conductive connection member facing the partition, and a resin layer made of material similar to that of the prismatic battery case is provided around the outer periphery thereof. By doing so, whether by resin molding or by thermal welding to the prismatic battery case, the conductive connection member is integrally joined to resin on the side of the prismatic battery case with ease and reliability, so that the leak of electrolytic solution between the elastic body layer and the resin of the prismatic battery case is certainly prevented.

As another preferable structure, the opening is provided in at least one side wall of the prismatic battery case and in a position where each partition is disposed, in such a manner as to face the containers on both sides, and the conductive connection member disposed in the opening is connected to the collectors positioned on both sides of the partition, and the conductive connection member is hermetically joined to the prismatic battery case via a resin layer, which is formed by baking synthetic resin, having an affinity to the composition material of the prismatic battery case, on the conductive connection member. By doing so, the resin on the side of the prismatic battery case and the conductive connection member are integrally joined with ease and reliability via the resin layer, so that the leak of electrolytic solution is certainly prevented.

Furthermore, if the resin layer is made of synthetic resin the melting point of which is lower than the injection molding temperature of the prismatic battery case, the conductive connection member is integrally joined to the prismatic battery case with reliability, and the leak of electrolytic solution is certainly prevented.

To actualize the prismatic sealed battery according to the above structure, the conductive connection member is connected to the collectors, and the gap between the periphery of the conductive connection member and the partition and the side wall of the prismatic battery case is hermetically joined by resin molding, and also the opening is sealed by resin molding. Or the conductive connection member is connected to the collectors, and the resin layer is hermetically joined to the opening edges of the partition and the side wall of the prismatic battery case, and the opening formed in the side wall of the prismatic battery case is sealed with a closing member, and then the closing member is hermetically joined to the outer surface of the resin layer.

As further another preferable structure, through holes, penetrating into the containers on both sides, are formed in at least one side wall of the prismatic battery case and in a position where each partition is disposed, and a conductive connection member having connection portions on both sides is provided. The connection portions are connected to the collectors positioned on both sides of the partition through the through holes. Sealing elements are disposed between the peripheries of the through holes and the conductive connection member, and the conductive connection member is embedded in the side wall of the prismatic battery case. By doing so, the through holes penetrate into the containers on both sides, and the sealing element seals the gap between the periphery thereof and the conductive connection member, so that high sealing performance against the leak of electrolytic solution is obtained.

In the prismatic sealed battery according to the first aspect of the invention, openings leading into the containers on both sides are formed in at least one side wall of the prismatic battery case and in at least one position where a partition is disposed, and a conductive connection member connects the electric power generation elements, contained in the containers on both sides, to each other through the openings. The gap between the opening leading into the container on at least one side and the connection projection of the conductive connection member connected to the electric power generation element through the opening is sealed, and the openings leading into the containers on both sides are sealed with a seal member in the state that the conductive connection member is disposed inside.

According to this structure, as in the case described above, since the connection path becomes short, connection resistance between the electric power generation elements becomes low. Also a plurality of connection paths even the distribution of current passing through the electric power generation elements, so that internal resistance per cell is further reduced, and even and full use of the capability of the whole electrode plate assembly achieves higher power output. Also the prismatic battery case is made compact, because a member for connection through the partition is not contained in the container. By sealing the container between the opening of the container on one side and the connection projection of the conductive connection member with reliability, electrolytic solution transfer is certainly prevented, and the seal member prevents the leak of electrolytic solution.

In the prismatic sealed battery according to the second aspect of the invention, openings leading into the containers on both sides are formed in at least one side wall of the prismatic battery case and in at least one position where a partition is disposed, and a conductive connection member connects the collectors of the electrode plate assemblies, contained in the containers on both sides, to each other through the openings. A sealing element is provided to seal the gap between the opening leading into the container on at least one side and the connection projection of the conductive connection member connected to the collector through the opening, and a seal member is provided to seal the openings leading into the containers on both sides in the state that the conductive connection member is disposed inside.

According to this structure, as in the case described above, the current-carrying path between the electrode plate assembly and the collector is straight and short in each container, and the conductive connection member connects the collectors, opposed to each other across the partition between the containers, through the openings formed in the side wall of the prismatic battery case, so that it is possible to connect the collectors to each other at desired positions. Thus, as compared with a case that the collectors are connected at their upper end portions, since the current-carrying path does not detour and the connection path becomes short, the connection resistance of the prismatic battery becomes low. Also a plurality of connection paths even the distribution of current passing through the electrode plate assembly, so that internal resistance is reduced, and even and full use of the capability of the whole electrode plate assembly achieves higher power output. By sealing the container between the opening of the container on one side and the connection projection of the conductive connection member with reliability, electrolytic solution transfer is certainly prevented, and the seal member prevents the leak of electrolytic solution.

It is preferable that the opening leading into the container on at least one side takes the shape of a circle, and the connection projection of the conductive connection member takes the shape of a round shaft, and the sealing element disposed between the connection projection and the opening is an O-ring. By doing so, simply inserting the connection projection, on the outer periphery of which the O-ring is fitted, into the opening seals the container and to prevent electrolytic solution transfer, so that manufacturing efficiency is improved.

Furthermore, it is preferable that a plate for constituting the conductive connection member is press molded into the shape of a cylinder with a bottom to form the connection projection. By doing so, the conductive connection member having the connection projection is manufactured at low cost. Since a welding electrode inserted into the conductive connection member having the shape of a cylinder readily welds and connects its bottom face to another part such as the collector with high reliability, adverse effect on the sealing element during welding is prevented.

In the each structure described above, if connection terminals at both ends of the prismatic battery case are connected to the collectors, and collectors are connected to each other through connection holes formed in the upper portion of the partitions of the prismatic battery case, it is possible to use manufacturing equipment of conventional prismatic sealed batteries, in which the upper portions of the collectors are connected, as is, while the structure described above reduces connection resistance. Furthermore, since the connection terminals connected to the outside of the prismatic sealed battery are provided in the upper portions of both end walls of the prismatic battery case, it is easy to connect the prismatic sealed batteries to each other, and to secure electrical insulation when a cooling device using water or the like is provided.

BEST MODE FOR CARRYING OUT THE INVENTION

Figure 22:
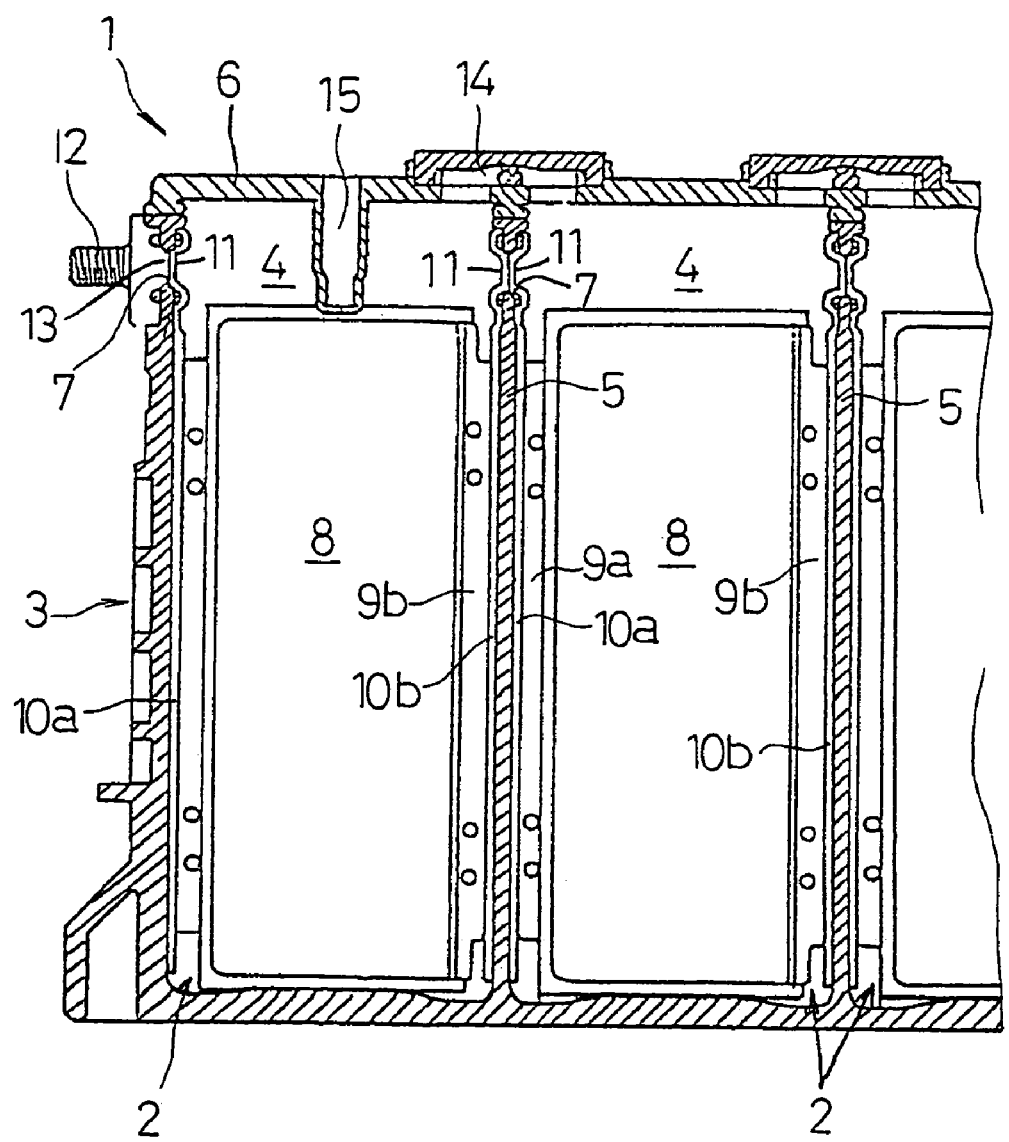
FIG. 22 is a partial longitudinal cross-sectional view of a conventional prismatic sealed battery.
Figure 23:
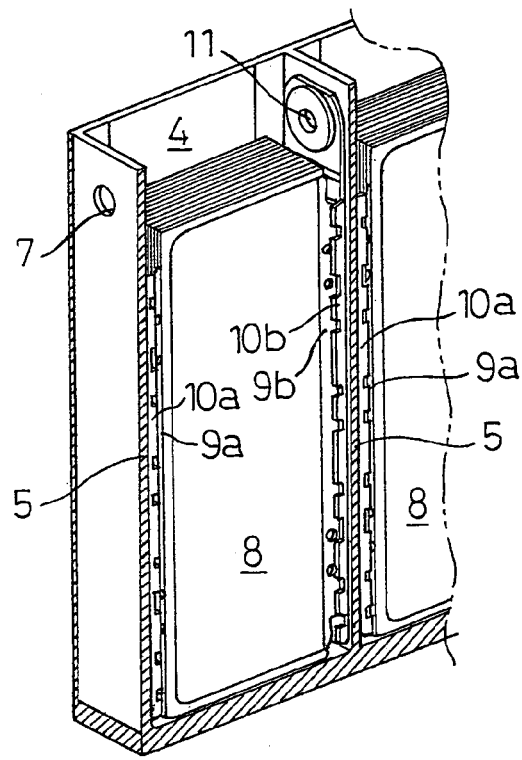
FIG. 23 is a perspective view of the conventional prismatic sealed battery, in which a container is partly cutaway.
Figure 24:
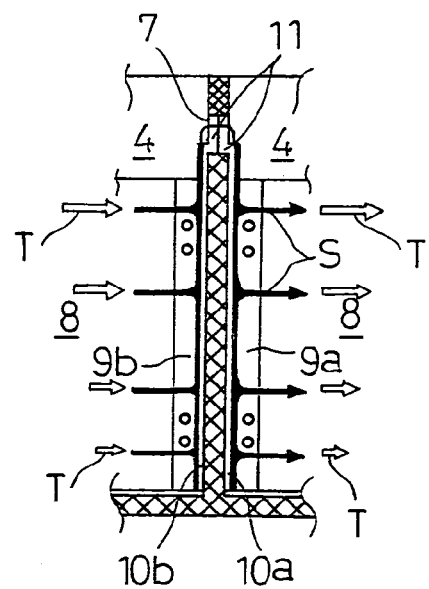
FIG. 24 is an explanatory view of a current-carrying path in the conventional prismatic sealed battery.

A first embodiment of a prismatic sealed battery according to the present invention will be hereinafter described with reference to FIGS. 1 to 6. Elements identical to those of the conventional battery which has been described with reference to FIGS. 22 and 23 will be designated by the same reference numbers, and differences will be mainly described.

Figure 1:
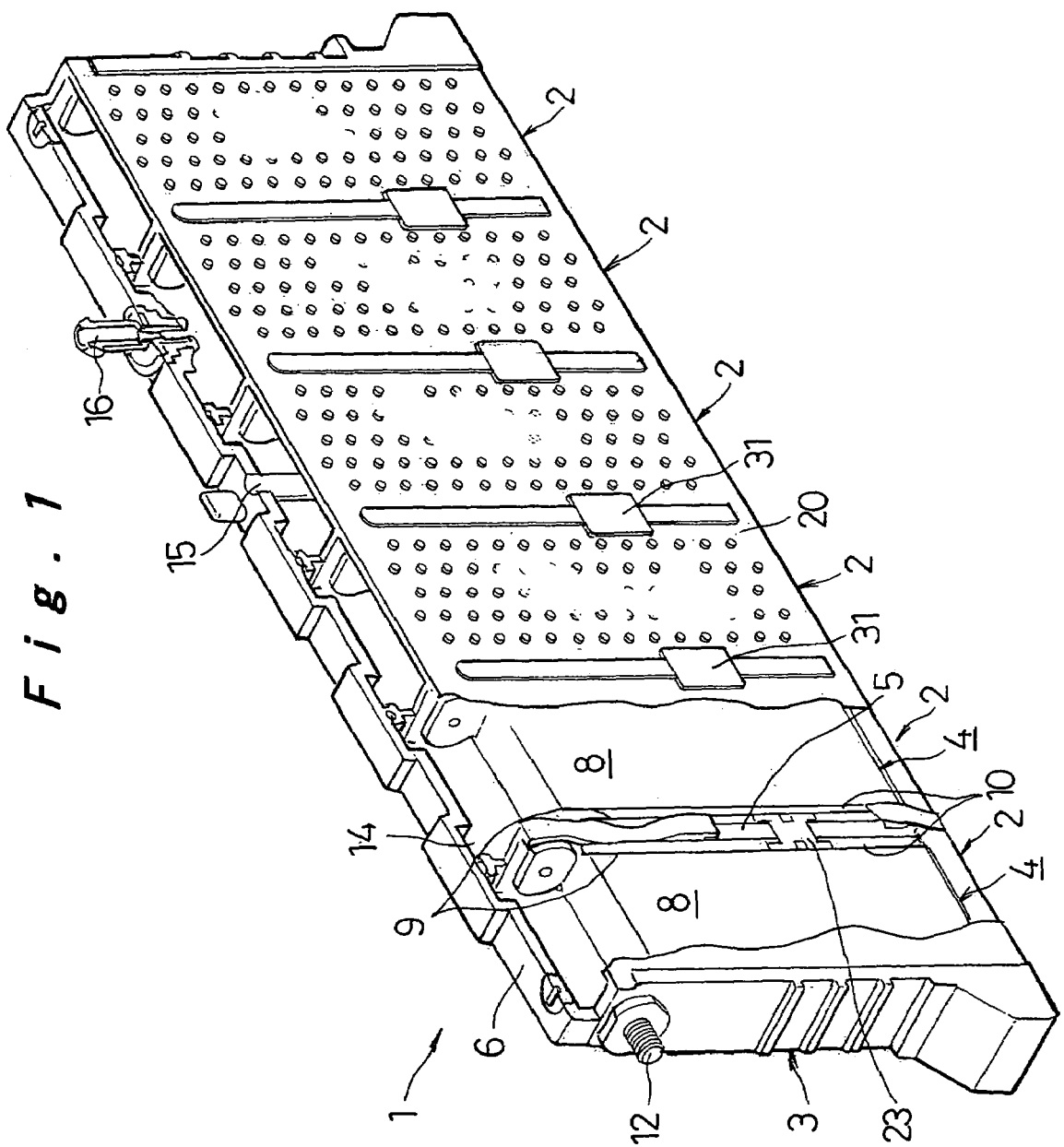
FIG. 1 is a partly cutaway perspective view of a prismatic sealed battery according to a first embodiment of the present invention.
Figure 2:
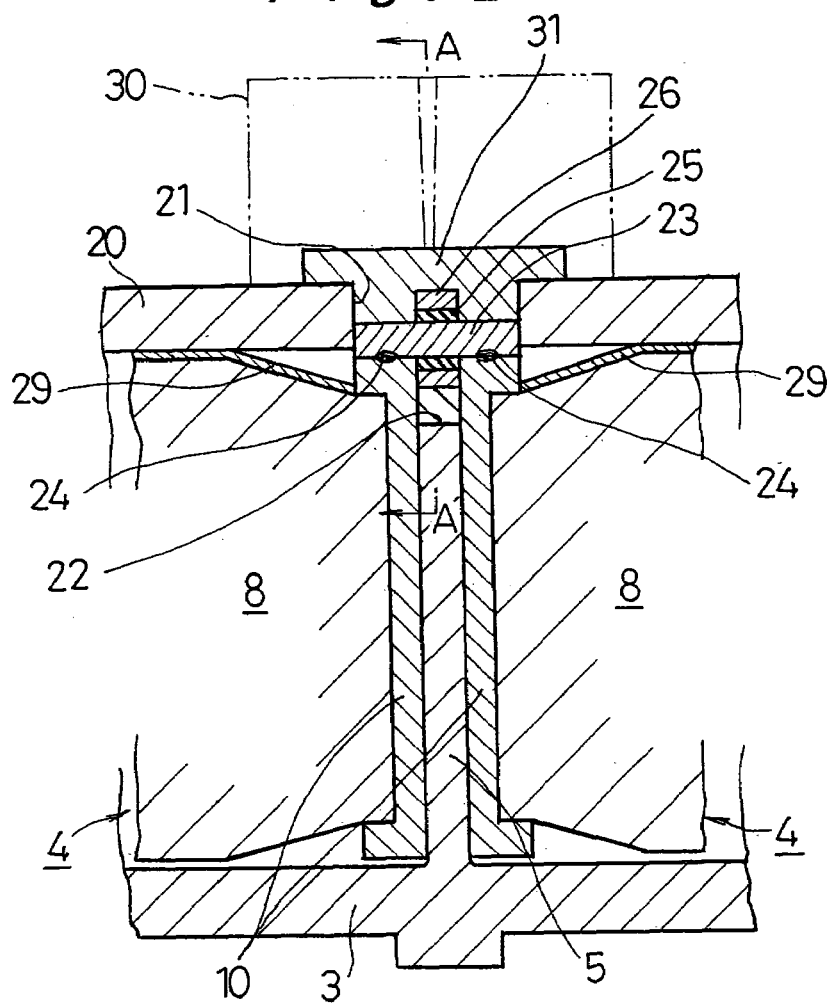
FIG. 2 is a horizontal cross-sectional view of an essential portion according to the embodiment.

Referring to FIG. 1, a prismatic battery case 3 of a prismatic sealed battery 1 according to the present invention comprises a plurality of prismatic containers 4, having narrow-width sides and wide-width sides, which are integrally coupled to one another in a row so as to share the narrow-width sides as partitions 5. The prismatic battery case 3 is made of synthetic resin such as an alloy of PP and PPE having resistance to electrolytic solution or the like. Each container 4 contains an electrode plate assembly 8, both sides of which are connected to collectors 10 (10a and 10b), with electrolytic solution, to compose a cell 2. Connection holes 7 (refer to FIG. 22) are formed in the upper portion of both end walls and the partitions 5 of the prismatic battery case 3. Connection terminals 12 are connected to the collectors 10 of both end cells 2 through the connection holes 7, and the collectors 10, 10 of the adjoining cells 2, 2 are connected to each other through the connection holes 7. In FIG. 1, a safety vent 16 is provided in a lid 6.

The electrode plate assembly 8 comprises a plurality of positive electrode plates and a plurality of negative electrode plates disposed alternatively, and a separator taking the shape of a sack with an opening in a horizontal direction is put on each positive electrode plate, so that the positive and negative electrode plates are laminated with separators interposed therebetween. One side of the positive electrode plates and the other side of the negative electrode plates protrude oppositely to each other to form lead portions 9 (9a and 9b) of the positive and negative electrode plates. The positive electrode plate is made of foamed metal of Ni to which nickel hydroxide is added except for the lead portion 9. To form the lead portion 9, pressure is applied to foamed metal to compress it, and then a lead plate is seam welded to the one surface thereof by ultrasonic welding. The negative electrode plate is made of punched metal of Ni to which negative electrode composition material including hydrogen-absorption alloy is applied except for the lead portion 9. A collector 10 is connected to the lead portion 9 on both sides of the electrode plate assembly 8 by electron beam welding or the like. The collector 10 is made of a steel plate the surface of which is plated with nickel.

In one side wall 20 of the prismatic battery case 3, as shown in FIGS. 2 to 5, one or a plurality of openings 21 is formed in a position where each partition 5 is disposed, in such a manner as to face the containers 4 on both sides. The opening 21 has a width equal to that between the ends of collectors 10 on both sides of the partition 5, and has proper length in a perpendicular direction. Under the opening 21, a notch 22 having the same length in the perpendicular direction and proper depth is formed in the partition 5.

A conductive connection member 23 is contained in the opening 21. The both sides of the conductive connection member 23 are connected to the collectors 10 on both sides by welding 24, so that electric current from the collector 10 of one cell 2 is carried into the collector 10 of the other cell 2 through the conductive connection member 23. It is preferable that the conductive connection member 23 is made of a nickel-plated steel plate, due to its resistance to electrolytic solution and low cost.

Figure 3:
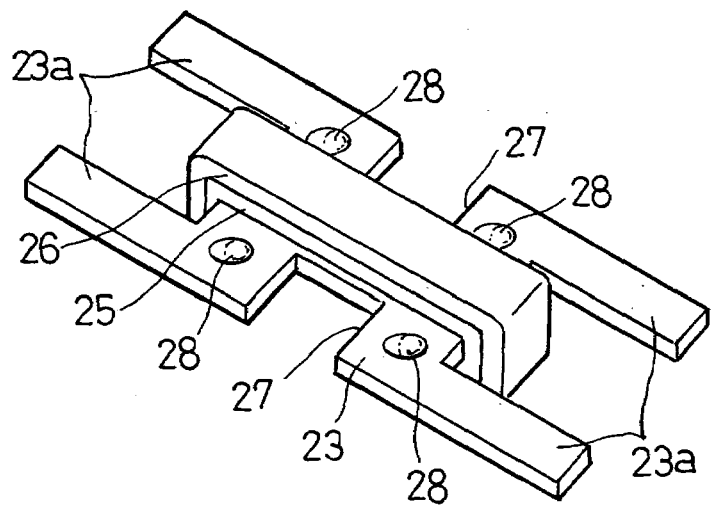
FIG. 3 is a perspective view of a conductive connection member according to the embodiment.
Figure 4:
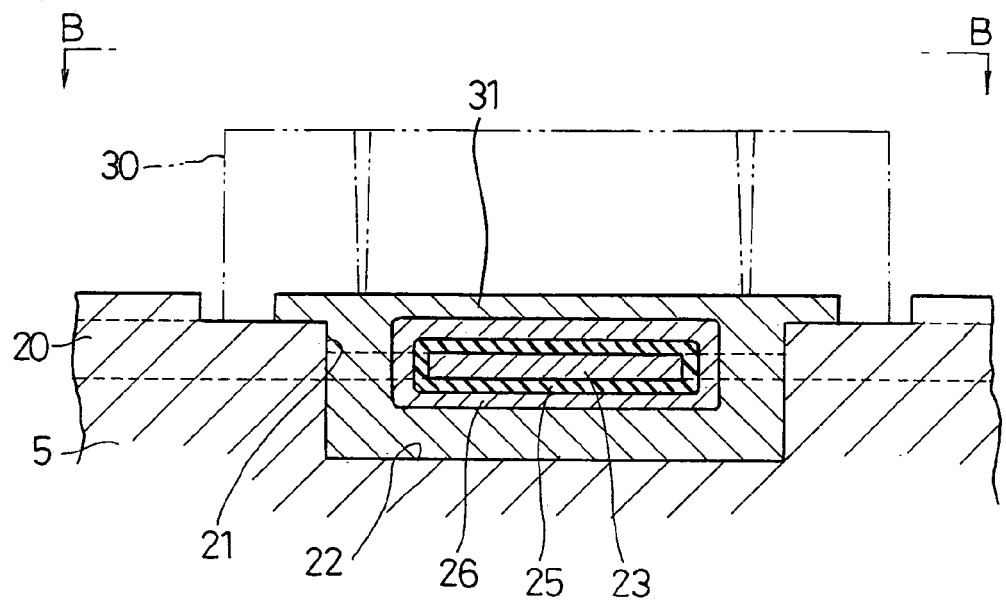
FIG. 4 is a cross-sectional view taken along the line A—A in FIG. 2.
Figure 5:
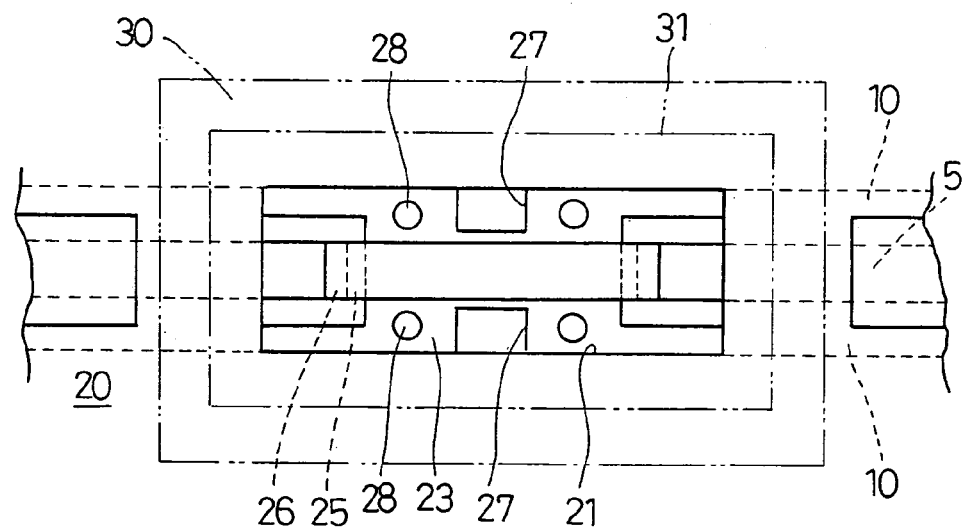
FIG. 5 is a plan view viewed from the side of B—B in FIG. 4.

Referring to FIG. 3, the conductive connection member 23 formed in the shape of approximately "H" comprises a rectangular plate, and protrusions 23a protruding upward and downward from both sides of the rectangular plate in a widthwise direction. The whole conductive connection member 23 has size just fitting into the opening 21. A ring-shaped elastic body layer 25, made of fluorinated rubber or other rubber materials having resistance to heat and electrolytic solution, is secured to the outer periphery of the middle of conductive connection member 23 in the widthwise direction by baking, and a ring-shaped resin layer 26 made of synthetic resin similar to that of the prismatic battery case 3 is formed around the outer periphery of the elastic body layer 25. Since the resin layer 26 is formed by injection molding, the injection pressure compresses the elastic body layer 25, and hence necessary sealing pressure occurs.

Notches 27 are formed on both sides of the middle of the conductive connection member 23 in a perpendicular direction. Welding projections 28, with which collectors 10 make tightly contact to carry out certain welding 24, are formed at upper and lower four points in total. Due to the notches 27, welding current certainly flows from one welding projection 28 to another one through the collector 10, when a welding electrode is pressed against each welding projection 28 of the conductive connection member 23 for welding. The shape of the welding projection 28 is not limited to a circle as illustrated in the drawing, but any shape such as a line with a zigzag pattern in cross section, a ring or the like is adoptable, and the number of the welding projections 28 is arbitrarily changeable.

After the conductive connection member 23 inserted and disposed into the opening 21 is connected to the collector 10 on both sides by welding 24, an injection molding die 30 makes tightly contact with the side wall 20 of the prismatic battery case 3 with the application of pressure so as to cover the opening 21, in order to hermetically seal the opening 21 and fill a gap between the notch 22 of the partition 5 and the outer periphery of the resin layer 26 by an injection molded sealing resin portion 31. A heat shield sheet 29 is provided in the side of the electrode plate assembly 8 on the side of the opening 21 and in the vicinity of the opening 21.

According to the structure described above, the conductive connection member 23 connects the collectors 10 which are opposed to each other across the partition 5 between the cells 2, 2, and the side of one collector 10 is connected to that of the other at one or a plurality of points through the conductive connection member 23. Thus, as compared with a case in which only the upper end portions of the collectors 10 are connected to each other by welding the connection projections 11, a current-carrying path does not detour, and a connection path becomes short, so that the connection resistance between cells 2 becomes low. Thus, further decrease in internal resistance per cell 2, 2 results in higher power output.

Since the elastic body layer 25 is disposed between the side wall 20 or the partition 5 of the prismatic battery case 3 and the conductive connection member 23, an exfoliation gap is prevented from occurring between them due to difference in the thermal expansion coefficients of the prismatic battery case 3 and the conductive connection member 23. Accordingly, electrolytic solution is prevented from leaking between cells 2, 2 and electrolytic solution transfer is prevented. Especially in a case where the elastic body layer 25 is made of fluorinated rubber which has high resistance to heat and electrolytic solution, the elastic body layer 25 holds necessary resistance to heat even if the temperature of the battery increases. The battery acts for a long time with stability, and hence high reliability for long time use is obtained. Since the elastic body layer 25 is provided on the outer periphery of a part of conductive connection member 23 facing the partition 5, and the resin layer 26 made of material similar to that of the prismatic battery case 3 is provided around the outer periphery thereof, the conductive connection member 23 is integrally joined to resin on the side of the prismatic battery case 3 with ease and reliability, so that the leak of electrolytic solution is certainly prevented between the elastic body layer 25 and the resin of the prismatic battery case 3.

According to this embodiment, since the connection terminal 12 on either side of the prismatic battery case 3 and the collector 10, and the collectors 10, 10 on both sides of each partition 5 are connected through the connection holes 7 formed in the upper portions of both end walls of the prismatic battery case 3 and the partitions 5, it is possible to use manufacturing equipment of conventional prismatic sealed batteries as is, while the structure described above reduces connection resistance. Furthermore, since the connection terminals 12 connected to the outside of the prismatic sealed battery 1 are provided in the upper portions of both end walls of the prismatic battery case 3, it is easy to connect the other prismatic sealed batteries 1 to each other, and to secure electrical insulation when a cooling device using water or the like is provided.

In the drawing, the resin layer 26 is provided around the outer periphery of the elastic layer 25 which is provided on the outer periphery of the conductive connection member 23, but the resin layer 26 may be omitted.

Figure 6:
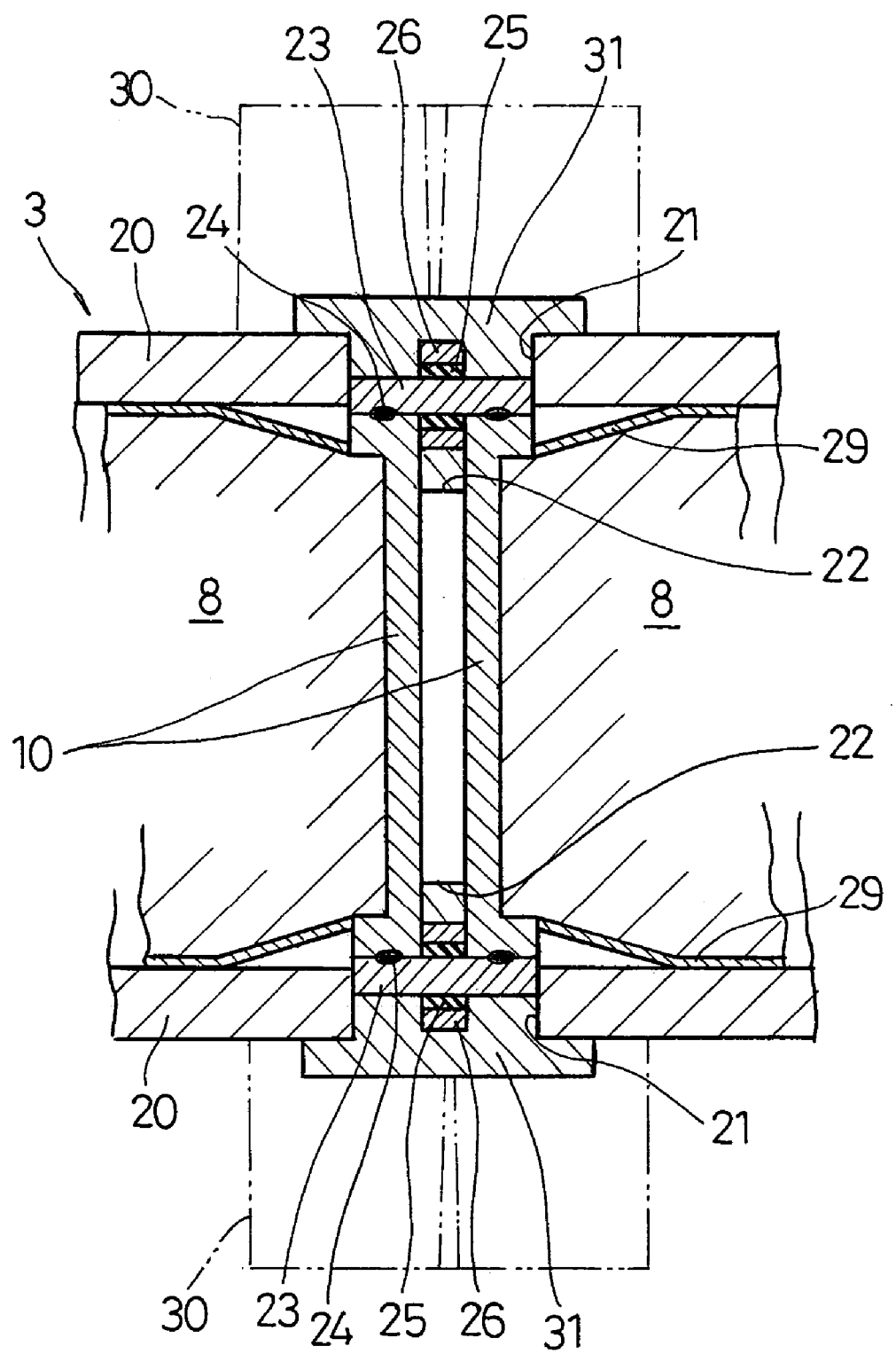
FIG. 6 is a horizontal cross-sectional view of an essential portion according to a modified example of the embodiment.

In the above description, the conductive connection member 23 connects the cells 2, 2 in the opening 21 provided in one side wall 20 of the prismatic battery case 3. However, as shown in FIG. 6, the openings 21 may be formed in both side walls 20 of the prismatic battery case 3 in such a manner as to be opposed to each other, and the conductive connection members 23 may connect the collectors 10, 10 on both sides of the partition 5 in both portions thereof. The injection molding dies 30 may be pressed against both sides of the prismatic battery case 3 to form the sealing resin portions 31 by injection molding. By doing so, since both portions of the collectors 10, 10 are connected to each other, connection resistance is further reduced. Furthermore, since pressure is evenly applied to both sides of the prismatic battery case 3, the collectors 10, and the electrode plate assembly 8 in injection molding, it is prevented that the action of load on one side of the electrode plate assembly 8 and movement due to the action and the like affect adversely.

Figure 7:
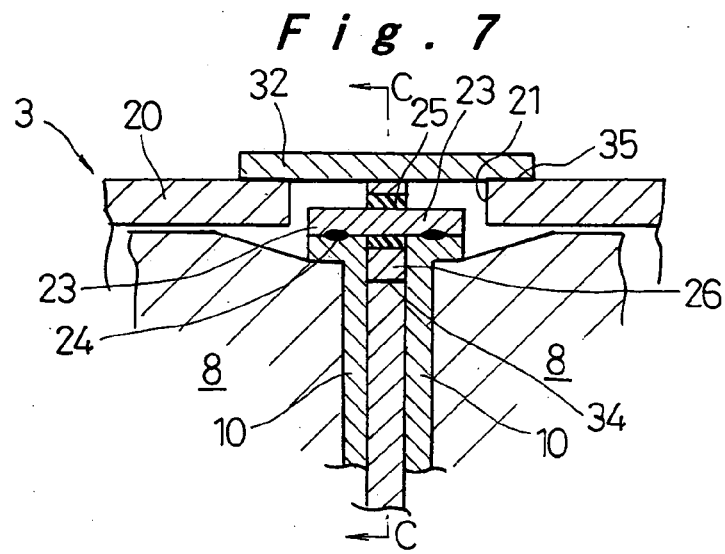
FIG. 7 is a horizontal cross-sectional view of an essential portion of a prismatic sealed battery according to a second embodiment of the invention.
Figure 8:
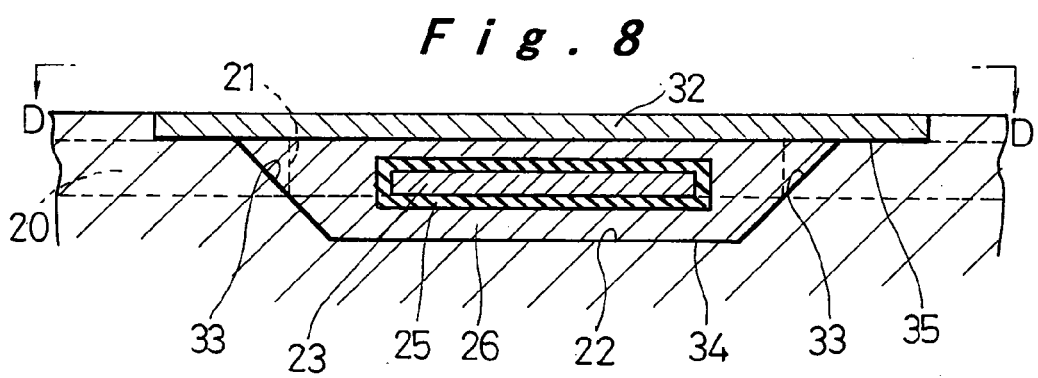
FIG. 8 is a cross-sectional view taken along the line C—C in FIG. 7.
Figure 9:
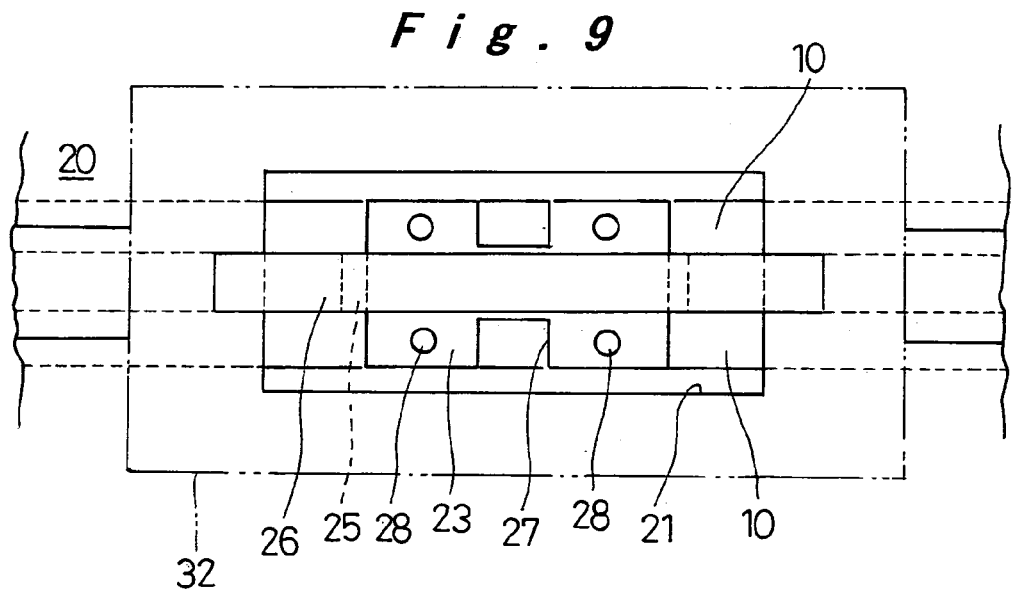
FIG. 9 is a plan view viewed from the side of D—D in FIG. 8.

A second embodiment of the prismatic sealed battery according to the present invention will be hereinafter described with reference to FIGS. 7 to 9. In the following description of the embodiment, elements identical to those of the foregoing embodiment will be designated by the same reference numbers and the description thereof will be omitted, and only differences will be described.

In the foregoing embodiment, the opening 21 is sealed with resin by molding, after the conductive connection member 23 is welded. In this embodiment, the conductive connection member 23 is connected to the collectors 10, 10 by welding, and the resin layer 26 is hermetically joined to the partition 5 of the prismatic battery case 3 and the opening edge of the opening 21. Then, after a closing member 32 seals the opening 21 formed in the side wall 20 of the prismatic battery case 3, the closing member 32 is hermetically joined to the outer surface of the resin layer 26.

To be more specific, the opening 21 is rectangular, and the whole conductive connection member 23 having the notches 27 and the welding projections 28 on both sides takes the shape of a rectangular plate smaller than the opening 21. The elastic body layer 25 is provided on the outer periphery of the middle of the conductive connection member 23 in the widthwise direction, and the resin layer 26 is provided on the outer periphery of the elastic body layer 25. The trapezoid-shaped notch 22 which widens outward is formed in the partition 5, and the edge of the opening 21 facing the notch 22 is cut into a triangle shape so as to form an inclined extension surface 33 which continues from the inclined surface of the trapezoid-shaped notch 22. The resin layer 26 is molded into a trapezoid shape, so that the outside shape thereof is along the end faces of the notch 22 and the inclined extension surfaces 33, and the one outer surface thereof is coplanar to the outer surface of the side wall 20.

The outer surface of the trapezoid-shaped resin layer 26 is integrally joined to the end face of the notch 22 and the inclined extension surfaces 33 at a thermal welding line 34 under a sealed state. The closing member 32 is so disposed as to cover the opening 21 and the periphery thereof, and the closing member 32 is integrally joined to the outer surface of the side wall 20 and the outer side surface of the resin layer 26 at a thermal welding line 35 under a sealed state.

In this embodiment too, since the conductive connection member 23 connects the collectors 10, 10 which are opposed to each other across the partition 5 between the cells 2, 2, the connection resistance between the cells 2, 2 decreases, so that further decrease in internal resistance per cell 2 results in higher power output. Since the elastic body layer 25 is provided on the outer periphery of a part of the conductive connection member 23 facing the partition 5, and the resin layer 26 made of the material similar to that of the prismatic battery case 3 is provided around the outer periphery of the elastic body layer 25, the resin layer 26 is integrally joined to resin on the side of the prismatic battery case 3 by thermal welding easily and certainly with ensuring a sealing state, so that the leak of electrolytic solution is certainly prevented between the elastic body layer 25 and the resin of the prismatic battery case 3.

Figure 10:
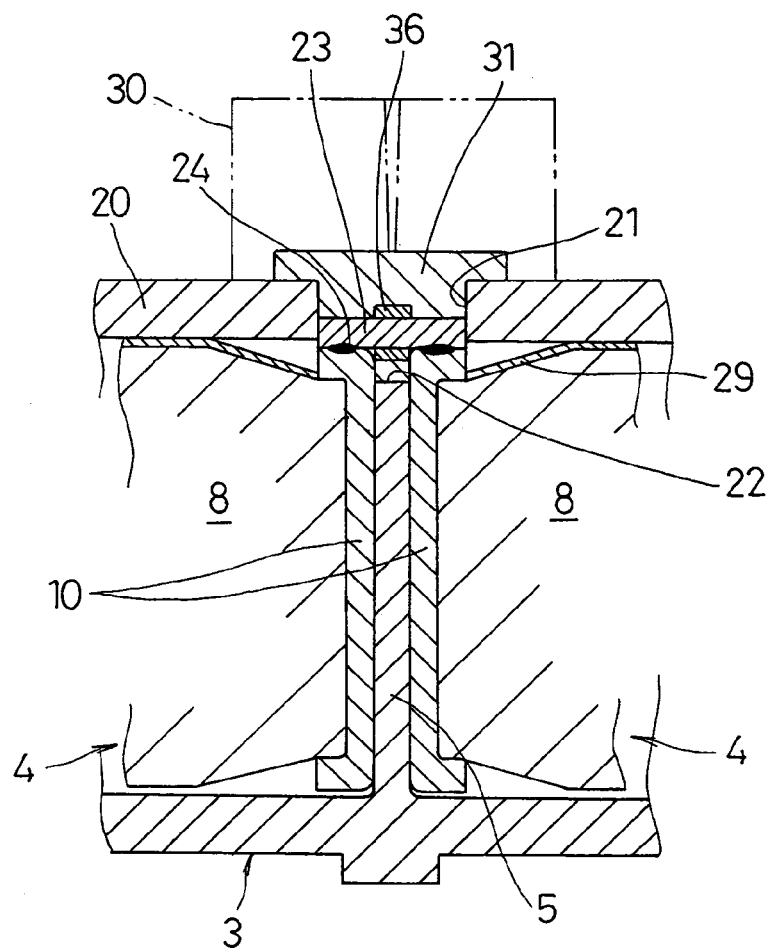
FIG. 10 is a horizontal cross-sectional view of an essential portion of a prismatic sealed battery according to a third embodiment of the invention.
Figure 11:
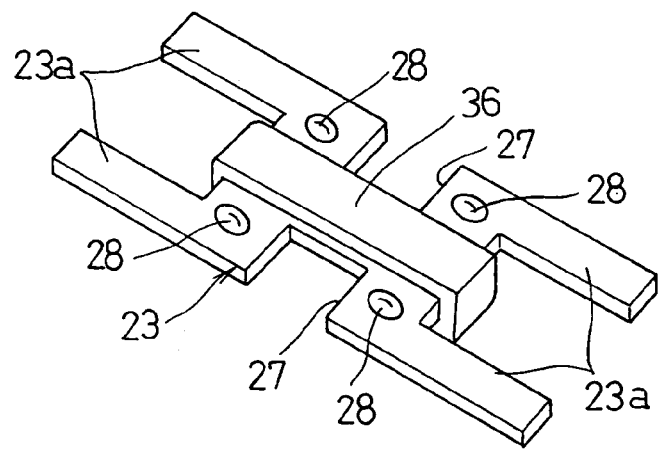
FIG. 11 is a perspective view of a conductive connection member according to the embodiment.

Then, a third embodiment of the prismatic sealed battery according to the present invention will be hereinafter described with reference to FIGS. 10 and 11.

In the foregoing embodiments, the elastic body layer 25 is secured to the outer periphery of the middle of the conductive connection member 23 in the widthwise direction by baking, and the ring-shaped resin layer 26 made of the synthetic resin similar to that of the prismatic battery case 3 is provided around the periphery thereof. In this embodiment, a baked resin layer 36, which is made of synthetic resin having an affinity to the composition material of the prismatic battery case 3, is provided on the outer periphery of the middle of the conductive connection member 23 in the widthwise direction by baking. To form the baked resin layer 36, it is preferable that fine particles of synthetic resin, the melting point of which is lower than the injection molding temperature of the synthetic resin of the prismatic battery case 3, are stuck on a predetermined area of the conductive connection member 23, and then the conductive connection member 23 with the fine particles is put in a furnace for baking. Taking a case where the prismatic battery case 3 is made of a polypropylene, polyethylene, or an alloy thereof, for example, it is preferable that the fine particles of epoxy resin is baked on.

After the conductive connection member 23 with the baked resin layer 36 disposed in the opening 21 is joined to the collectors 10 on both sides of the partition 5 by welding 24, the injection molding die 30 is so disposed as to cover the opening 21 in order to seal and close the opening 21. By injection molding the sealing resin portion 31 in such a manner as to fill the gap between the notch 22 of the partition 5 and the outer periphery of the baked resin layer 36, the gap between the prismatic battery case 3 and the conductive connection member 23 is joined with the baked resin layer 36 integrally stuck on the conductive connection member 23 and the sealing resin portion 31 integrally stuck thereon, so that the containers 4, 4 and the opening 21 are completely sealed.

According to this embodiment, since the conductive connection member 23 is integrally and tightly joined to the resin on the side of the prismatic battery case 3 via the baked resin layer 36 with ease and reliability, the leak of electrolytic solution is prevented than ever before.

In the drawing, the opening 21 is sealed with the injection molded sealing resin portion 31 as in the case of the first embodiment, but the baked resin layer 36 may be hermetically joined to the partition 5 of the prismatic battery case 3 as in the case of the second embodiment, and the closing member 32 may seal the opening 21, and then the closing member 32 may be hermetically joined to the outer surface of the baked resin layer 36.

A fourth embodiment of the prismatic sealed battery according to the present invention will be hereinafter described with reference to FIGS. 12 to 15.

Figure 12:
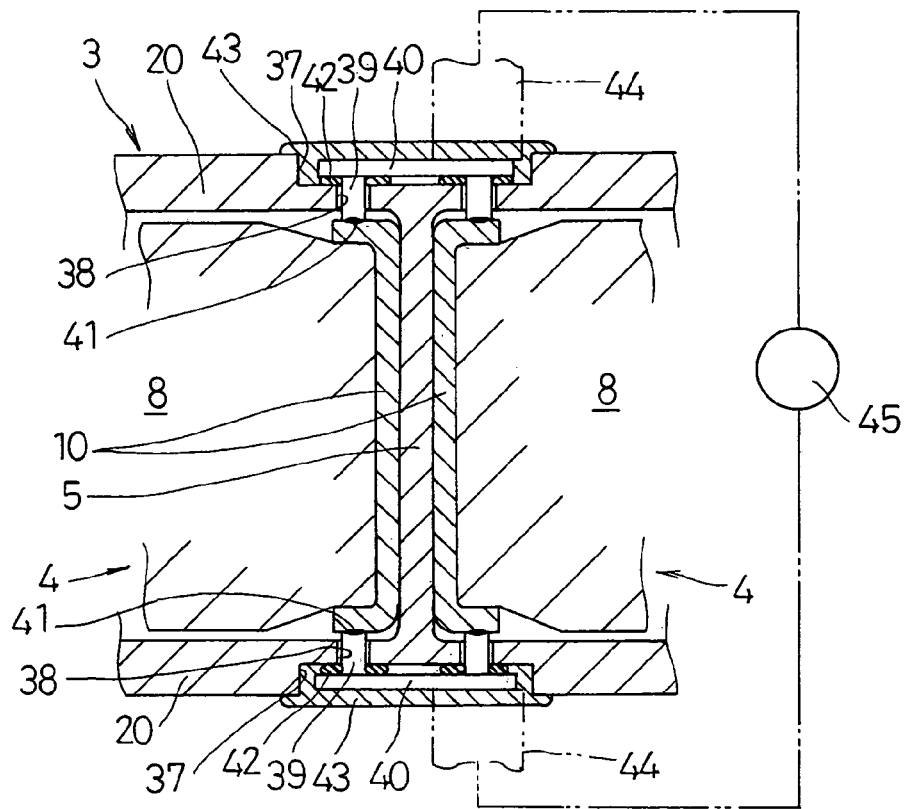
FIG. 12 is a horizontal cross-sectional view of an essential portion of a prismatic sealed battery according to a fourth embodiment of the invention.
Figure 13:
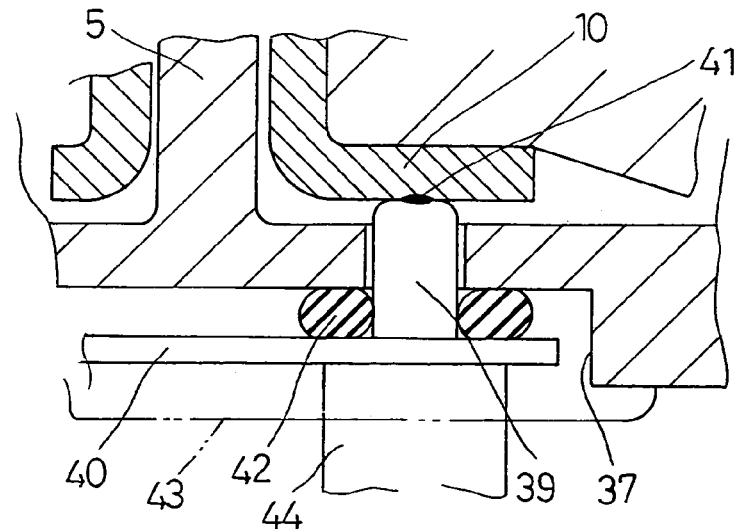
FIG. 13 is an enlarged horizontal cross-sectional view of the essential portion according to the embodiment.

In each of the foregoing embodiments, the rectangular opening 21 facing the containers 4 on both sides of the partition 5 is formed in the side face 20 of the prismatic battery case 3, and the conductive connection member 23 disposed in the opening 21 is joined to the collectors 10, and then the opening 21 is sealed with the sealing resin portion 31 and the closing member 32. In this embodiment, as shown in FIGS. 12 and 13, a recess 37 having width across the containers 4 on both sides is formed in a position, where each partition 5 is disposed, of the side wall 20 of the prismatic battery case 3. Through holes 38 penetrating into the containers 4 on both sides are formed in the bottom face of the recess 37. A conductive connection member 40, which has connection portions 39 connected to the collectors 10 positioned on both sides of the partition 5 through the through holes 38, is disposed in the recess 37, and the connection portion 39 is joined to the collector 10 by welding 41. It is preferable to use, as the conductive connection member 40, a nickel-plated steel plate due to its resistance to electrolytic solution and low cost.

An O-ring 42 as a sealing element is fitted on the outer periphery of the connection portion 39 in the shape of a round shaft, and when the connection portions 39 are joined to the collectors 10, the O-rings 42 pressed between the bottom face of the recess 37 and the conductive connection member 40 seal the through holes 38. The recess 37 is filled with sealing resin 43 under the condition that the conductive connection member 40 is embedded.

In a joining process of the foregoing structure, as shown in FIGS. 12 and 13, the recesses 37 and the through holes 38 are formed in both side walls 20 of the prismatic battery case 3, and the conductive connection member 40 having the connection portions 39 with the O-rings 42 is disposed in each recess 37 with inserting the connection portions 39 into the through holes 38. Then, as shown by imaginary lines in FIG. 12 and by solid lines in FIG. 13, welding electrodes 44 are disposed behind the connection portions 39, 39 which are in contact with both sides of one of the collectors 10 on both sides of the partition 5, to apply pressure. In this state of things, a resistance welder 45 applies welding current in order to join the connection portions 39 of the conductive connection members 40 to both sides of the collector 10 by welding 41. Then, the other connection portions 39, 39 are joined to both sides of the other collector 10 by welding 41 in a like manner, so that both sides of the collectors 10 on both sides are connected through the conductive connection members 40. Then, the sealing resin 43 is injection molded while an injection molding die (not illustrated) is pressed against the side wall 20, to complete junction.

Figure 14:
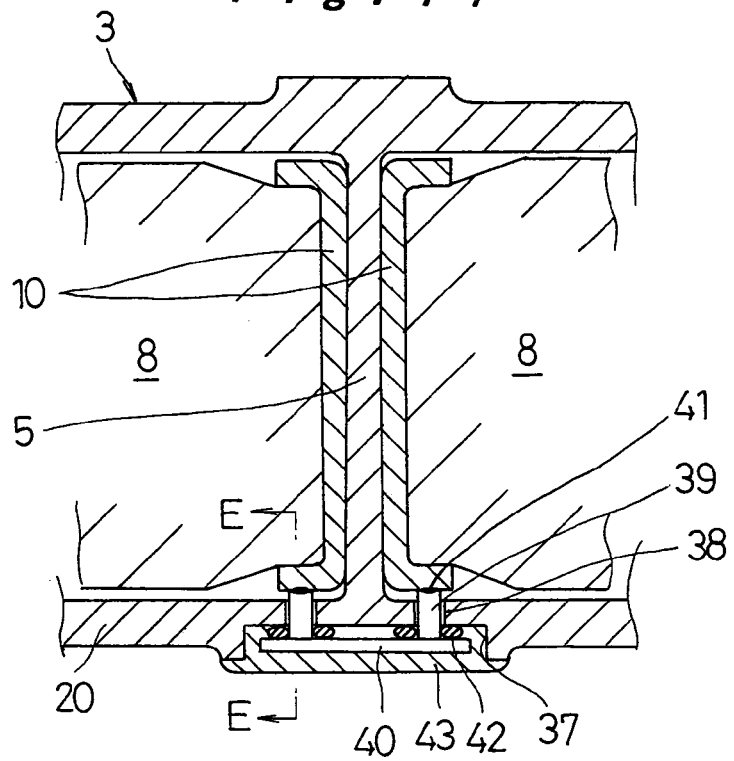
FIG. 14 is a horizontal cross-sectional view of an essential portion according to a modified example of the embodiment.
Figure 15:
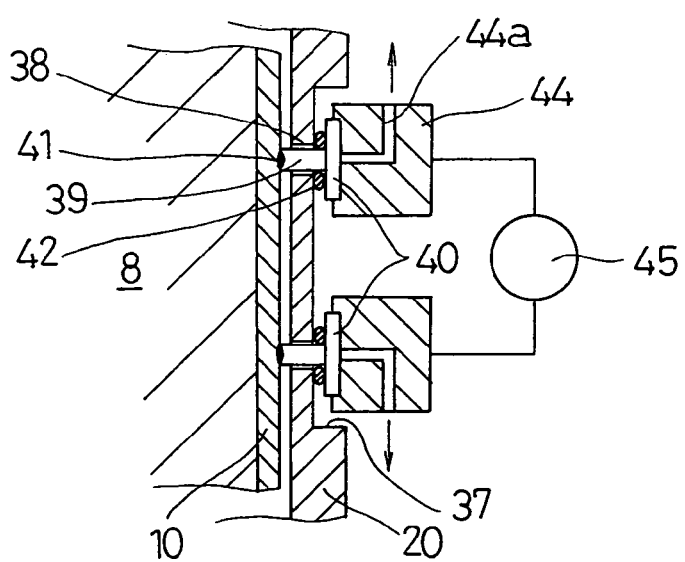
FIG. 15 is a longitudinal cross-sectional view taken along the line E—E in FIG. 14, which shows a joining process of a conductive connection members to a collector in the modified example.
Figure 16:
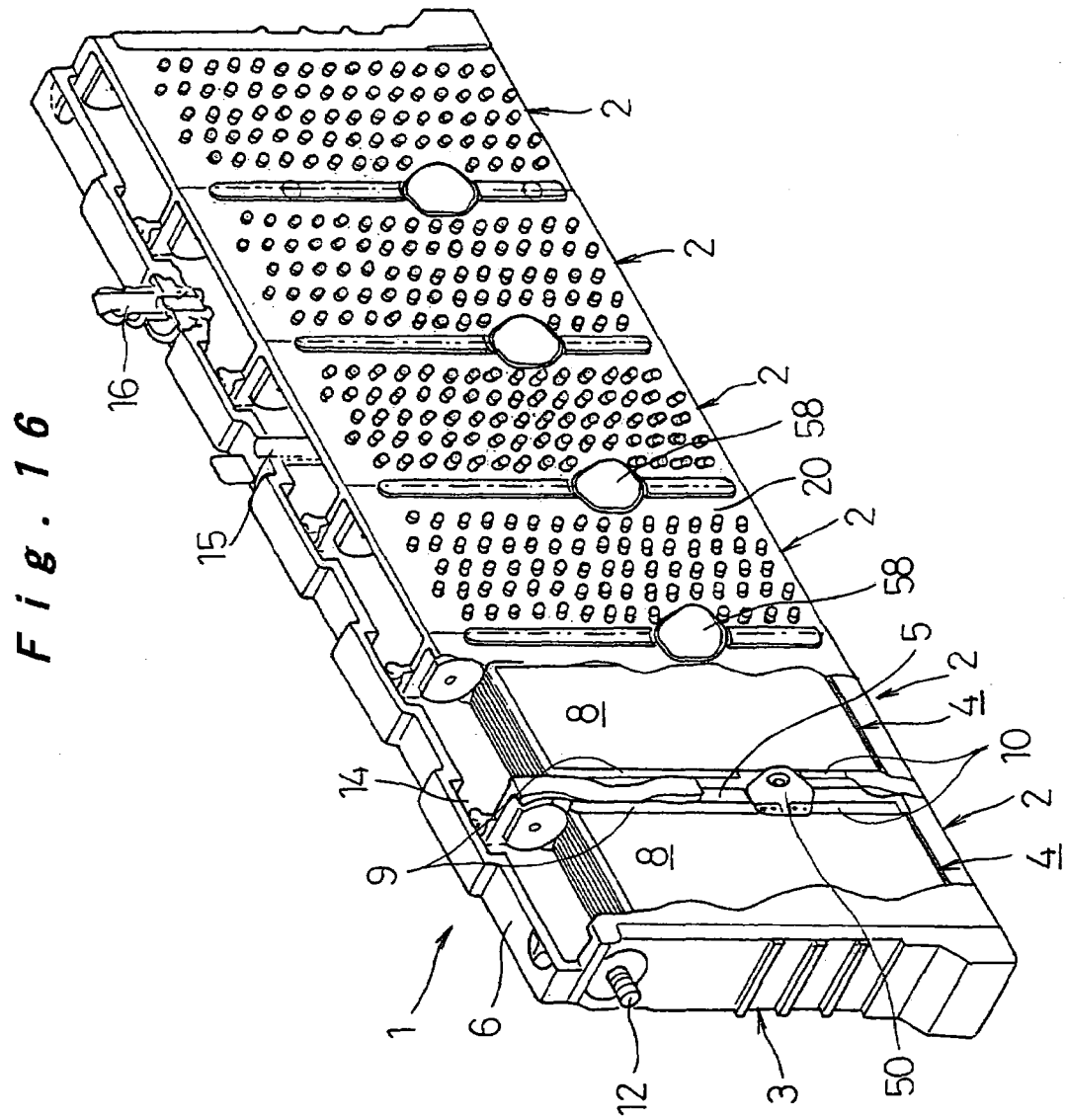
FIG. 16 is a partly cutaway perspective view of a prismatic sealed battery according to one embodiment of the invention.

In the foregoing description, the recesses 37 are formed in both side walls 20 of the prismatic battery case 3 to connect both sides of the collectors 10, 10 by the conductive connection member 40 disposed in the recesses 37, but as shown in FIGS. 14 and 15, only one side of the collectors 10, 10 may be connected. In this case, the recess 37 is formed in one side wall, and the through holes 38 penetrating into the containers 4 on both sides of the partition 5 are formed in the upper and lower portions in the recess 37. A pair of conductive connection members 40, one of which is in the upper portion and the other is in the lower portion, is disposed in such a manner that the connection portions 39 inserted into the through holes 38 on both sides of the partition 5 make contact with the collectors 10, and the welding electrodes 44 are disposed behind the upper and lower connection portions 39, 39 which are in contact with the collector 10 on one side of the partition 5. Then, applying welding current by the resistance welder 45, the upper and lower conductive connection members 40 are connected to one collector 10 by welding 41. Then, in the like manner, the welding electrodes 44 are disposed behind the upper and lower connection portions 39, 39, which are in contact with the collector 10 on the other side of the partition 5, and the resistance welder 45 applies welding current to connect the upper and lower conductive connection members 40 to the other collector 10 by welding 41. Therefore, the collectors 10 on both sides of the partition 5 are connected with the pair of upper and lower conductive connection members 40.

If the welding electrode 44 has a suction path 44a for holding the conductive connection member 40 by suction, workability is improved. The upper and lower conductive connection members 40 are completely separated in the drawing, but it may be possible to use a single conductive connection member in which the upper and lower conductive connection members are integrally coupled via a narrow portion, through which current is hard to pass. The connection portion 39 is in the shape of a round shaft, but may be formed with a rectangular member in section by folding. In this case, however, it becomes difficult to seal the battery with high reliability.

According to this embodiment, since the through holes 38 are so formed as to penetrate into the containers 4, 4 on both sides of the partition 5, and a sealing element such as the O-ring 42 or the like seals the gap between the vicinity of the through hole 38 and the conductive connection member 40, high sealing performance against the leak of electrolytic solution is obtained.

In each of the foregoing embodiments, the welding electrode is pressed against the conductive connection member 23 or 40, and welding current is applied to the conductive connection member 23 or 40 and the collector 10 for resistance welding, but an electron beam or a laser beam may be applied to melt and weld a localized area by heat. Resistance welding, however, is preferable because of less thermal effect on a periphery. A wax member may be provided in the conductive connection member 23 or 40 and the connection portion of the collector 10 to braze them, or a conductive adhesive element or the like may be used to bond them.

A fifth embodiment of the prismatic sealed battery according to the present invention will be hereinafter described with reference to FIGS. 16 to 21.

Figure 17:
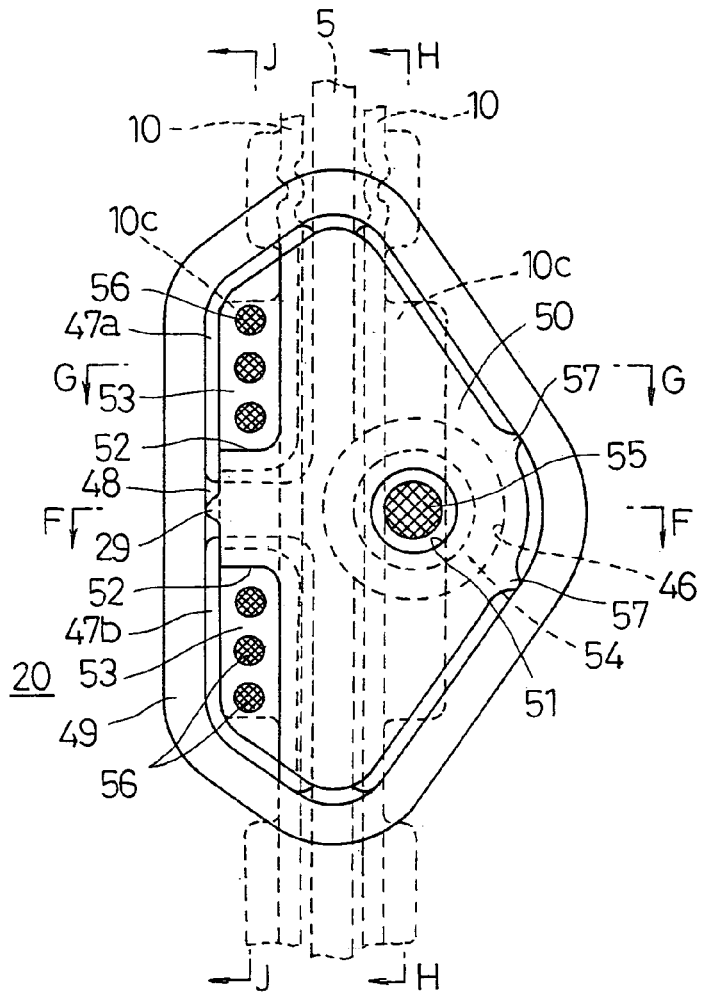
FIG. 17 is a front view of an essential portion according to the embodiment, before a sealing element is welded.

Referring to FIGS. 16 to 21, openings 46 connected to the containers 4 on one side of each partition 5, and pairs of upper and lower openings 47a and 47b connected to the containers 4 on the other side thereof are formed in one side wall 20 of the prismatic battery case 3. The circular opening 46 having a relatively large diameter is so disposed that the center thereof is just opposed to the folded side edge portion 10c of the collector 10, and the openings 47a and 47b are narrow slots, which are slightly long in the perpendicular direction and have width almost corresponding to the width of the folded side edge portion 10c of the collector 10, formed with leaving a coupling portion 48 for reinforcement between them. In the outer surface of the side wall 20, a ring-shaped ridge 49 for hermetically sealing is so provided as to surround the openings 46, 47a and 47b. The folded side edge portions 10c of the collectors 10 facing the openings 46, 47a and 47b, as shown in FIG. 17, are wider than the other, and have length corresponding to the length between the openings 47a and 47b.

A conductive connection member 50, made of a steel plate by press molding the surface of which is plated with nickel so as to have resistance to electrolytic solution, is disposed in a space surrounded by the ring-shaped ridge 49 on the outer surface of the side wall 20. The conductive connection member 50 has a connection projection 51 in the shape of a cylinder with a bottom which gets into the opening 46 to make contact with the folded side edge portion 10c of the collector 10 at its tip end, and steps 52 for forming contact faces 53 which get into openings 47a and 47b to make contact with the folded side edge portion 10c of the collector 10 are formed.

An O-ring 54 is disposed between the outer periphery of the connection projection 51 of the conductive connection member 50 and the inner periphery of the opening 46 in the state of compression, to completely seal the container 4 on one side, and the tip end of the connection projection 51 in the shape of a cylinder with a bottom is joined to the folded side edge portion 10c of the collector 10 by resistance welding at a welding portion 55. In resistance welding, a welding electrode is inserted into the cylinder with the bottom, so that welding is efficiently and certainly carried out without the O-ring 54 being affected. The contact face 53 of the conductive connection member 50 is joined to the folded side edge portion 10c of the collector 10 by resistance welding at a plurality of welding portions 56. A plurality of positioning projections 57, the end of which makes tightly contact with the inner periphery of the ring-shaped ridge 49, is formed in the outer periphery of the conductive connection member 50.

Figure 18:
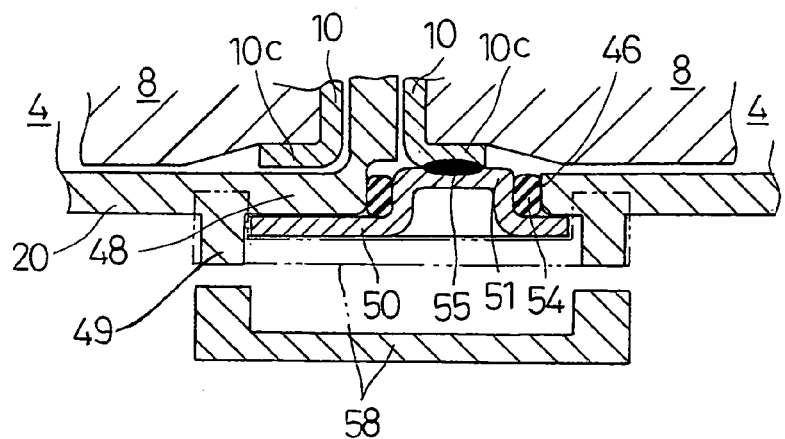
FIG. 18 is a cross-sectional view taken along the line F—F in FIG. 17.
Figure 19:
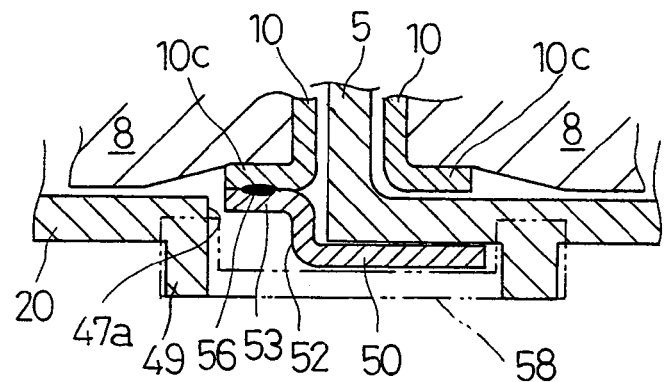
FIG. 19 is a cross-sectional view taken along the line G—G in FIG. 17.
Figure 20:
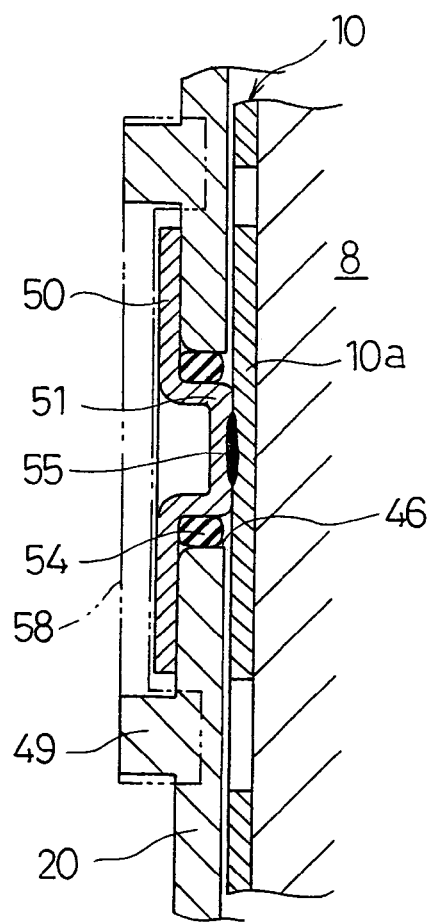
FIG. 20 is a cross-sectional view taken along the line H—H in FIG. 17.
Figure 21:
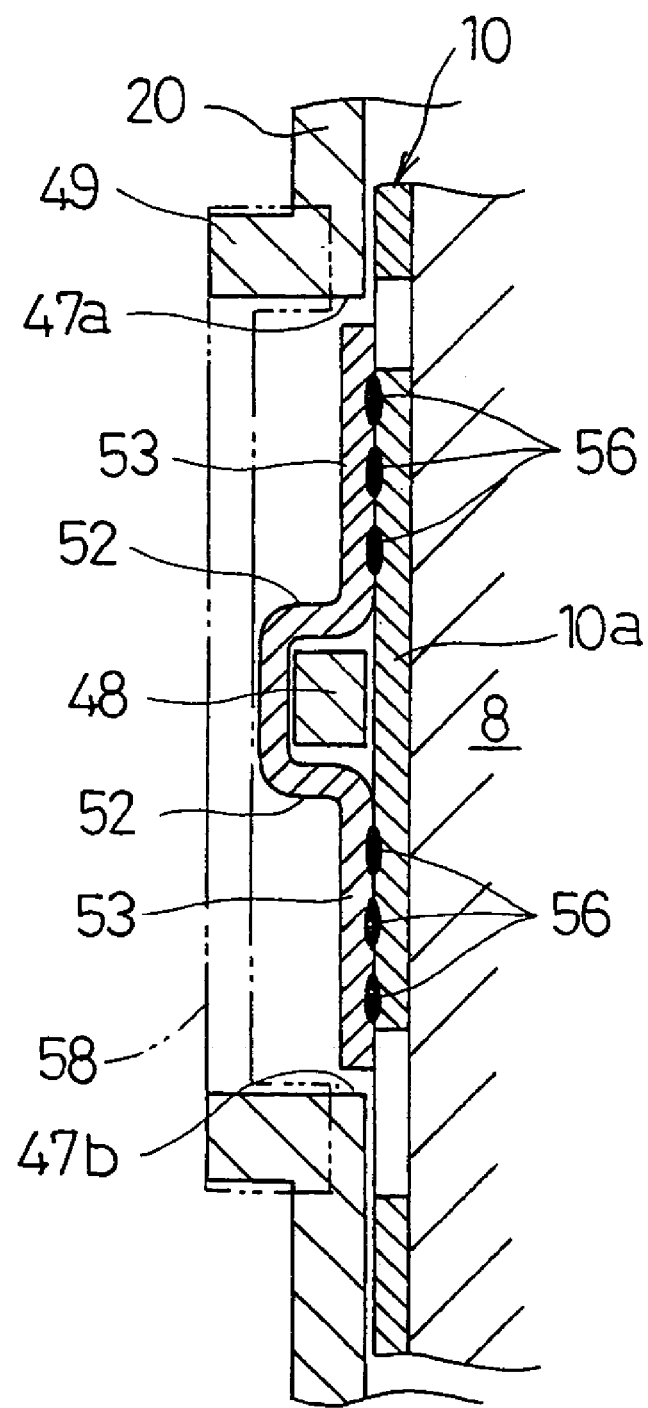
FIG. 21 is a cross-sectional view taken along the line J—J in FIG. 17.

A seal member 58 made of the same synthetic resin as the prismatic battery case 3 has the outside shape corresponding with the outer periphery of the ring-shaped ridge 49. After the connection projection 51 and the contact faces 53 of the conductive connection member 50 are joined to the folded side edge portions 10c of the collectors 10 on both sides of the partition 5 at welding portions 55 and 56, the seal member 58 disposed opposite to the ring-shaped ridge 49, as shown in FIG. 18, is thermally welded by pressing it against the ring-shaped ridge 49 with the application of heat, in order to seal the space surrounded by the ring-shaped ridge 49 from the outside, as shown in FIGS. 18 to 21.

According to this embodiment, as described above, a current-carrying path between the electrode plate assembly 8 and the collector 10 is straight and short in each container 4 of the prismatic battery case 3, and the conductive connection member 50 connects the collectors 10, 10, opposed to each other across the partition 5 between the containers 4, 4, through the openings 46, 47a and 47b formed in one side wall 20 of the prismatic battery case 3, so that it is possible to connect the collectors 10, 10 to each other at desired positions. Thus, as compared with a conventional battery in which the collectors 10 are connected only at upper end portions, since the current-carrying path does not detour and the connection path becomes short, connection resistance between the cells 2, 2 becomes low. Also a plurality of connection paths even the distribution of current passing through the electrode plate assembly 8, so that internal resistance per cell is further reduced, and even and full use of the capability of the whole electrode plate assembly 8 achieves higher power output. Also, the prismatic battery case 3 is made compact, because a member for connecting the collectors 10 through the partition 5 is not contained in the container 4. By sealing the gap between the opening 46 leading into the container 4 on one side and the connection projection 51 of the conductive connection member 50, electrolytic solution transfer between the containers 4, 4 is certainly prevented from being occurring, and the seal member 58 prevents the leak of electrolytic solution into the outside.

Since the opening 46 leading into the container 4 on one side is made in the shape of a circle, the connection projection 51 of the conductive connection member 50 is made in the shape of a round shaft, and the O-ring 54 as a sealing element seals between the connection projection 51 and the opening 46, simply inserting the connection projection 51, on the outer periphery of which the O-ring 54 is fitted, into the opening 46 seals the container 4 and to prevent electrolytic solution transfer, so that manufacturing efficiency is improved. If a sealing agent such as pitch or the like is applied in fitting the O-ring 54 on the connection projection 51, the gap between the opening 46 and the connection projection 51 is filled with the sealing agent in addition to the O-ring 54, and hence increase in sealing performance further ensures the prevention of occurrence of electrolytic solution transfer.

Furthermore, since the connection projection 51 is formed by press molding a plate for constituting the conductive connection member 50 into the shape of a cylinder with a bottom, the conductive connection member 50 having the connection projection 51 is manufactured with high productivity. Since the welding electrode inserted into the conductive connection member 50 having the shape of a cylinder readily welds and connects its bottom face to the collector 10 with high reliability, adverse effect on the O-ring 54 during welding is prevented.

In the above embodiment, the openings 46, 47a and 47b are formed in the one side wall 20 of the prismatic battery case 3, and the connection projection 51 and the contact faces 53 of the conductive connection member 50 are connected to the folded side edge portions 10c of the collectors 10 on each side. The openings 46, 47a and 47b may be formed in both side walls 20 of the prismatic battery case 3 in an opposite manner to each other, in order to connect both sides of the collectors 10, 10 on both sides of the partition 5 to the conductive connection members 50. In this case, connection resistance further decreases because both sides of the collectors 10, 10 are connected. Also since pressure is evenly applied to both sides of the electrode plate assembly 8 in welding, it is prevented that the action of load on one side of the electrode plate assembly 8 and movement due to the action and the like affect adversely.

In the conductive connection member 50 of the above embodiment, the connection projection 51 is provided on one side, and the contact faces 53 are provided on the other side, but the connection projections 51 may be symmetrically provided on both sides. In this case, a pair of O-rings 54 is necessary, but the containers 4, 4 are double-sealed, so that the occurrence of electrolytic solution transfer is prevented still further. Also by omitting the seal member 58, only the conductive connection member 50 may be fixed, and hence a manufacturing process is simplified.

INDUSTRIAL APPLICABILITY

According to a prismatic sealed battery of the present invention, a conductive connection member connects collectors on both sides of a partition through an opening, which is formed in at least one side wall and in a position where each partition is disposed, in such a manner as to connect both containers. Thus, since the collectors opposed to each other across the partition between cells are connected by the conductive connection member in the position of the side wall of a prismatic battery case, shortening of the connection path between the cells brings about decrease in connection resistance, and hence the prismatic sealed battery can actualize high power output due to further decrease in internal resistance per cell.

The invention claimed is:

1. A prismatic sealed battery, comprising:
a prismatic battery case having a plurality of prismatic containers coupled in a row via partitions extending crosswise between opposed lateral side walls, each of said containers containing an electric power generation element, wherein an opening is formed in at least one of said lateral side walls of said prismatic battery case and in at least one position where each of said partitions is disposed, in such a manner as to lead into said containers on both sides; and
a conductive connection member connecting said electric power generation elements disposed on both sides of said partition through said opening.

2. A prismatic sealed battery, comprising:
a prismatic battery case having a plurality of prismatic containers coupled in a row via partitions extending crosswise between opposed lateral side walls;
an electrode plate assembly having positive and negative electrode plates laminated with a separator interposed therebetween, one side of said positive electrode plates and the other side of said negative electrode plates protruding oppositely to each other to form lead portions;
collectors joined to said lead portions on both sides of said electrode plate assembly, each of said containers containing said electrode plate assembly with said collectors joined thereto, wherein an opening is formed in at least one of said lateral side walls of said prismatic battery case and in at least one position where each of said partitions is disposed, in such a manner as to lead into said containers on both sides; and
a conductive connection member connecting said collectors disposed on both sides of said partition through said opening.

3. The prismatic sealed battery according to claim 2, wherein said conductive connection member is hermetically joined to said prismatic battery case via an elastic body layer.

4. A prismatic sealed battery, comprising:
a prismatic battery case having a plurality of prismatic containers coupled in a row via partitions;
an electrode plate assembly having positive and negative electrode plates laminated with a separator interposed therebetween, one side of said positive electrode plates and the other side of said negative electrode plates protruding oppositely to each other to form lead portions;
collectors joined to said lead portions on both sides of said electrode plate assembly, each of said containers containing said electrode plate assembly with said collectors joined thereto, wherein an opening is formed in at least one side wall of said prismatic battery case and in at least one position where each of said partitions is disposed, in such a manner as to lead into said containers on both sides; and
a conductive connection member connecting said collectors disposed on both sides of said partition through said opening, said opening being provided in at least one side wall of said prismatic battery case and in a position where each partition is disposed, in such a manner as to face said containers on both sides, and said conductive connection member disposed in said opening is connected to said collectors on both sides of said partition, and said conductive connection member is hermetically joined to said prismatic batten case via an elastic body layer, said elastic body layer being made of a fluorinated rubber.

5. The prismatic sealed battery according to claim 3, wherein said elastic body layer is provided on an outer periphery of a portion of said conductive connection member facing said partition, and a resin layer made of a material similar to that of said prismatic battery case is provided on an outer periphery of said elastic body layer.

6. The prismatic sealed battery according to claim 2, wherein said conductive connection member is hermetically joined to said prismatic battery case via a resin layer which is formed by baking a synthetic resin having an affinity to a composition material of said prismatic battery case on said conductive connection member.

7. A prismatic sealed battery, comprising:
a prismatic battery case having a plurality of prismatic containers coupled in a row via partitions;
an electrode plate assembly having positive and negative electrode plates laminated with a separator interposed therebetween, one side of said positive electrode plates and the other side of said negative electrode plates protruding oppositely to each other to form lead portions;
collectors joined to said lead portions on both sides of said electrode plate assembly, each of said containers containing said electrode plate assembly with said collectors joined thereto, wherein an opening is formed in at least one side wall of said prismatic battery case and in at least one position where each of said partitions is disposed, in such a manner as to lead into said containers on both sides; and
a conductive connection member connecting said collectors disposed on both sides of said partition through said opening, said opening being provided in at least one side wall of said prismatic battery case and in a position where each of said partitions is disposed, in such a manner as to face said containers on both sides, said conductive connection member disposed in said opening is being connected to said collectors on both sides of said partition, said conductive connection member being hermetically joined to said prismatic battery case via a resin layer which is formed by baking a synthetic resin having an affinity to a composition material of said prismatic battery case on said conductive connection member, said resin layer being made of a synthetic resin the melting point of which is lower than an injection molding temperature of said prismatic battery case.

8. The prismatic sealed battery according to any one of claims 3, 5, 6, and 7, wherein said conductive connection member is connected to said collectors, a periphery of said conductive connection member is hermetically joined to said partition and said side wall of said prismatic battery case by resin molding, and said opening is also sealed by resin molding.

9. The prismatic sealed battery according to any one of claims 5, 6, and 7, wherein said conductive connection member is connected to said collectors, said resin layer is hermetically joined to opening edges of said partition and said side wall of said prismatic battery case, the opening formed in said side wall of said prismatic battery case is sealed with a closing member, and said closing member is hermetically joined to the outer surface of said resin layer.

10. A prismatic sealed battery, comprising:
a prismatic battery case having a plurality of prismatic containers coupled in a row via partitions;
an electrode plate assembly having positive and negative electrode plates laminated with a separator interposed therebetween, one side of said positive electrode plates and the other side of said negative electrode plates protruding oppositely to each other to form lead portions;
collectors joined to said lead portions on both sides of said electrode plate assembly, each of said containers containing said electrode plate assembly with said collectors joined thereto, wherein an opening is formed in at least one side wall of said prismatic battery case and in at least one position where each of said partitions is disposed, in such a manner as to lead into said containers on both sides; and
a conductive connection member connecting said collectors disposed on both sides of said partition through said opening, a through hole being formed in at least one side wall of said prismatic battery case and in a position where each of said partitions is disposed, said through hole penetrating into said containers on both sides, a conductive connection member having connection portions on both sides is provided, said connection portions are connected to said collectors positioned on both sides of said partition through said through hole, a sealing element is provided between a periphery of said through hole and said conductive connection member, and said conductive connection member is embedded in said side wall of said prismatic battery case.

11. The prismatic sealed battery according to claim 1, wherein a gap between said opening and a connection projection of said conductive connection member connected to said electric power generation element through said opening is sealed, and each said opening leading into each of said containers on both sides is sealed with a seal member in the state where said conductive connection member is disposed inside.

12. The prismatic sealed battery according to claim 11, wherein said opening leading into said container on at least one side is in the shape of a circle, said connection projection of said conductive connection member is in the shape of a round shaft, and a sealing element disposed between said connection projection and said opening is an O-ring.

13. The prismatic sealed battery according to claim 2, a sealing element is provided for sealing a gap between said opening and a connection projection of said conductive connection member connected to said collector through said opening, and a seal member for sealing said openings leading into said containers on both sides in the state where said conductive connection member is disposed inside.

14. The prismatic sealed battery according to claim 13, wherein said opening leading to said container on at least one side is in the shape of a circle, said connection projection of said conductive connection member is in the shape of a round shaft, and said sealing element disposed between said connection projection and said opening is an O-ring.

15. The prismatic sealed battery according to claim 12 or 14, wherein a plate for constituting said conductive connection member is press molded into the shape of a cylinder with a bottom to form said connection projection.

16. The prismatic sealed battery according to claim 1 or 2, wherein:
said prismatic battery case includes a pair of end walls; and
connection terminals are connected to said collectors through connection holes formed in an upper portion of both of said pair of end walls and said partitions of said prismatic battery case, and said collectors are connected to each other.

17. A prismatic sealed battery, comprising:
a prismatic battery case bounded by mutually opposed first and second side walls and mutually opposed first and second end walls, said battery case being subdivided via partitions extending crosswise between said first and second side walls into discrete prismatic containers arranged in a row between said first and second end walls;

a lid receivable to said first and second side walls and said first and second end walls to enclose said battery case from above;

each of said containers containing an electric power generation element, wherein an opening is formed in at least one of said first and second side walls of said prismatic battery case in at least one position where each of said partitions is disposed, in such a manner as to lead into adjacent ones of said containers located on opposed sides of a common one of the partitions; and a conductive connection member connecting said electric power generation elements disposed on said opposed sides of said common one of the partitions through said opening.

18. A prismatic sealed battery, comprising:

a prismatic battery case bounded by mutually opposed first and second side walls and mutually opposed first and second end walls, said battery case being subdivided via partitions extending crosswise between said first and second side walls into discrete prismatic containers arranged in a row between said first and second end walls;

a lid receivable to said first and second side walls and said first and second end walls to enclose said battery case from above;

an electrode plate assembly having positive and negative electrode plates laminated with a separator interposed therebetween, one side of said positive electrode plates and the other side of said negative electrode plates protruding oppositely to each other to form lead portions;

collectors joined to said lead portions on both sides of said electrode plate assembly, each of said containers containing said electrode plate assembly with said collectors joined thereto, an opening being formed in at least one of said first and second side walls of said prismatic battery case and in at least one position where each of said partitions is disposed, in such a manner as to lead into adjacent ones of said containers located on opposed sides of a common one of the partitions; and a conductive connection member connecting said collectors disposed on said opposed sides of said common one of the partitions through said opening.

* * * * *